(12) United States Patent
Park et al.

(10) Patent No.: US 10,341,980 B2
(45) Date of Patent: Jul. 2, 2019

(54) METHOD FOR RECEIVING REFERENCE SIGNAL IN WIRELESS COMMUNICATION SYSTEM AND DEVICE FOR SAME

(71) Applicant: LG ELECTRONICS INC., Seoul (KR)

(72) Inventors: Hanjun Park, Seoul (KR); Hyunho Lee, Seoul (KR); Daesung Hwang, Seoul (KR); Bonghoe Kim, Seoul (KR); Kijun Kim, Seoul (KR); Jonghyun Park, Seoul (KR); Hyangsun You, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/313,775

(22) PCT Filed: Aug. 28, 2015

(86) PCT No.: PCT/KR2015/009085
§ 371 (c)(1),
(2) Date: Nov. 23, 2016

(87) PCT Pub. No.: WO2016/032293
PCT Pub. Date: Mar. 3, 2016

(65) Prior Publication Data
US 2017/0201960 A1 Jul. 13, 2017

Related U.S. Application Data

(60) Provisional application No. 62/043,393, filed on Aug. 28, 2014, provisional application No. 62/151,439, filed on Apr. 23, 2015.

(51) Int. Cl.
*G01S 5/02* (2010.01)
*G01S 5/06* (2006.01)
(Continued)

(52) U.S. Cl.
CPC .............. *H04W 64/00* (2013.01); *G01S 5/02* (2013.01); *G01S 5/0236* (2013.01); *G01S 5/06* (2013.01);
(Continued)

(58) Field of Classification Search
CPC ...... H04W 64/00; H04L 5/0051; H04L 69/22; H04L 64/003; H04B 17/336; G01S 5/0236
(Continued)

(56) References Cited

U.S. PATENT DOCUMENTS

2010/0317351 A1   12/2010   Gerstenberger et al.
2013/0051317 A1*  2/2013    Ji ........................ H04W 24/02
                                                            370/328
2014/0176366 A1*  6/2014    Fischer ............... H04W 64/006
                                                            342/374

FOREIGN PATENT DOCUMENTS

WO    WO 2013/172588 A1    11/2013

OTHER PUBLICATIONS

3GPP, "3rd Generation Partnership Project; Technical Specification Group Radio Access Network; Evolved Universal Terrestrial Radio Access (E-UTRA); LTE Positioning Protocol (LPP) (Release 12)," 3GPP TS 36.355 V12.2.0, Jun. 2014, pp. 1-126.

* cited by examiner

*Primary Examiner* — Shahriar Behnamian
(74) *Attorney, Agent, or Firm* — Birch, Stewart, Kolasch & Birch, LLP

(57) ABSTRACT

According to one embodiment of the present invention, a method by which a terminal receives a reference signal for determining a position in a wireless communication system comprises the steps of: receiving information, which relates to a neighboring cell, including information relating to a plurality of cells to which an aggregation positioning refer- (Continued)

Separate PRS

Aggregate PRS ence signal (PRS) is transmitted; receiving the aggregation PRS by using the information relating to a plurality of cells; and measuring a reference signal time difference (RSTD) for the plurality of cells by using the received aggregation PRS, wherein a sequence of the aggregation PRS can be initialized by unique identifiers allocated to the plurality of cells.

12 Claims, 8 Drawing Sheets

(51) Int. Cl.
    *H04L 5/00*         (2006.01)
    *H04L 29/06*       (2006.01)
    *H04W 64/00*      (2009.01)
    *H04B 17/336*     (2015.01)

(52) U.S. Cl.
    CPC ......... *H04B 17/336* (2015.01); *H04L 5/0051* (2013.01); *H04L 69/22* (2013.01); *H04W 64/003* (2013.01)

(58) Field of Classification Search
    USPC ......... 455/456.1, 456.2, 456.3, 456.4, 456.5, 455/456.6, 457
    See application file for complete search history.

METHOD FOR RECEIVING REFERENCE SIGNAL IN WIRELESS COMMUNICATION SYSTEM AND DEVICE FOR SAME

CROSS REFERENCE TO RELATED APPLICATIONS

This application is the National Phase of PCT/KR2015/009085 filed on Aug. 28, 2015, which claims priority under 35 U.S.C. § 119(e) to U.S. Provisional Application No. 62/043,393 filed on Aug. 28, 2014 and U.S. Provisional Application No. 62/151,439 filed on Apr. 23, 2015, all of which are hereby expressly incorporated by reference into the present application.

TECHNICAL FIELD

The present invention relates to a wireless communication system, and more particularly, to a method of receiving a reference signal in a wireless communication system and an apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE OF THE INVENTION

Technical Task

A technical task of the present invention is to provide a method of receiving a reference signal in a wireless communication system and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of receiving a reference signal for positioning by a terminal in a wireless communication system, include receiving neighboring cell-related information including information on a plurality of cells from which an aggregated positioning reference signal (PRS) is transmitted, receiving the aggregated PRS using the information on the plurality of the cells, and measuring a reference signal time difference (RSTD) for the plurality of the cells using the received aggregated PRS. In this case, a sequence of the aggregated PRS may be initialized by a unique identifier assigned to the plurality of the cells.

Additionally or alternately, the unique identifier assigned to the plurality of the cells may be associated with geographic location relation information among the plurality of the cells.

Additionally or alternately, the information on the plurality of the cells may include the unique identifier assigned to the plurality of the cells.

Additionally or alternately, the information on the plurality of the cells can include PRS configuration information on each of the plurality of the cells.

Additionally or alternately, the PRS configuration information may include cyclic prefix (CP) length information and cell specific reference signal (CRS) antenna port configuration information of a corresponding cell.

Additionally or alternately, when the CP length information or the CRS antenna port configuration information, which is included in the PRS configuration information on each of a plurality of the cells, is not the same, or the CP length information or the CRS antenna port configuration information is included in PRS configuration information on a part of the plurality of the cells only, if there is a primary cell configured for the terminal among the plurality of the cells, the method may further include determining that CP length information or CRS antenna port configuration information included in PRS configuration information of the primary cell is applied to the aggregated PRS. If there is no primary cell among the plurality of the cells, the method may further include determining that CP length information or CRS antenna port configuration information, which is included in PRS configuration information of a cell of a lowest cell index among the remaining cells, is applied to the aggregated PRS.

Additionally or alternately, if the CP length information or the CRS antenna port configuration information, which is included in the PRS configuration information on each of the plurality of the cells, is not the same, or the CP length information or the CRS antenna port configuration information is included in PRS configuration information on a part of the plurality of the cells only, the method may further include determining that CP length information or CRS antenna port configuration information included in PRS configuration information of a predetermined cell is applied to the aggregated PRS.

Additionally or alternately, when the CP length information or the CRS antenna port configuration information, which is included in the PRS configuration information on each of the plurality of the cells, is not the same, or the CP length information or the CRS antenna port configuration information is included in PRS configuration information on a part of the plurality of the cells only, if PRS configuration information on one or more cells among a plurality of the cells includes an extended CP length, the method may further include determining that the extended CP length is applied to the aggregated PRS. In this case, the extended CP length may be configured in a subframe in which the aggregated PRS is transmitted only.

Additionally or alternately, if the CP length information or the CRS antenna port configuration information, which is included in the PRS configuration information on each of the plurality of the cells, is not the same, or the CP length information or the CRS antenna port configuration information is included in PRS configuration information on a part of the plurality of the cells only, the method may further include determining that transmission of the aggregated PRS is not valid.

Additionally or alternately, if PRS configuration information on a single cell among the plurality of the cells includes CP length information or CRS antenna port configuration information, the method may further include determining that CP length information or CRS antenna port configuration information on the single cell is applied to the aggregated PRS.

Additionally or alternately, if the CP length information or the CRS antenna port configuration information, which is included in the PRS configuration information on each of the plurality of the cells, is the same, the method may further include determining that transmission of the aggregated PRS is valid.

Additionally or alternately, the method may further include receiving information on a valid section for generating a single RSTD measurement value based on the aggregated PRS.

Additionally or alternately, a RSTD measurement priority for a plurality of the cells may be determined by a highest RSTD measurement priority among the plurality of the cells.

Additionally or alternately, the RSTD measurement priority for the plurality of the cells may be determined according to reception quality of an aggregated PRS received from each of the plurality of the cells.

To further achieve these and other advantages and in accordance with the purpose of the present invention, according to a different embodiment, a terminal configured to receive a reference signal for positioning in a wireless communication system includes an RF (radio frequency) unit and a processor configured to control the RF unit, the processor if further configured to receive neighboring cell-related information including information on a plurality of cells from which an aggregated positioning reference signal (PRS) is transmitted, receive the aggregated PRS using the information on the plurality of the cells, measure an reference signal time difference (RSTD) for the plurality of the cells using the received aggregated PRS. In this case, a sequence of the aggregated PRS may be initialized by a unique identifier assigned to the plurality of the cells.

The aforementioned solutions are just a part of embodiments of the present invention. Various embodiments to which technical characteristics of the present invention are reflected can be drawn and understood based on detail explanation on the present invention to be described in the following by those skilled in the corresponding technical field.

Advantageous Effects

According to one embodiment of the present invention, it is able to efficiently receive and measure a reference signal in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
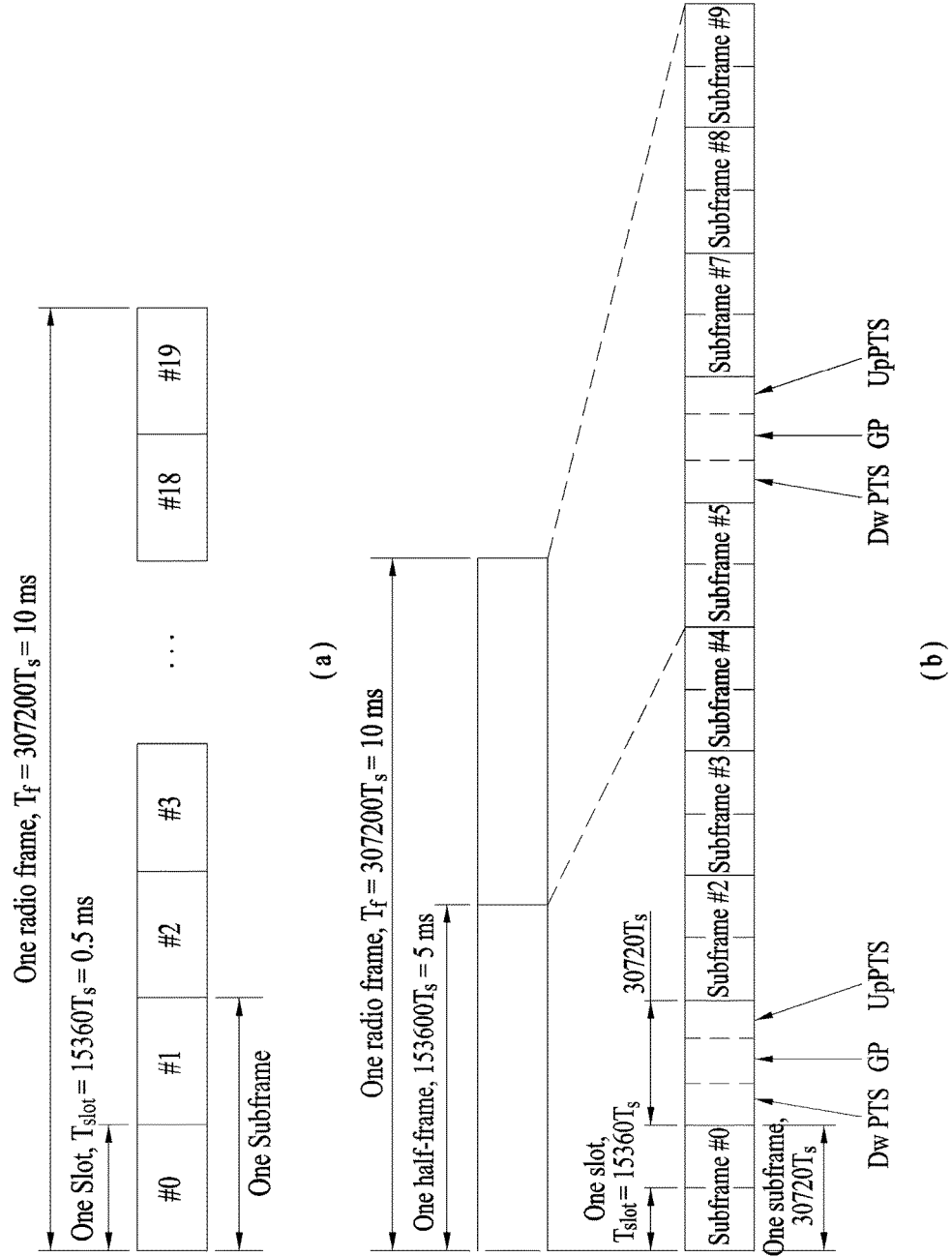
FIG. 1 is a diagram for an example of a radio frame structure used in wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL config- uration | Downlink- to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
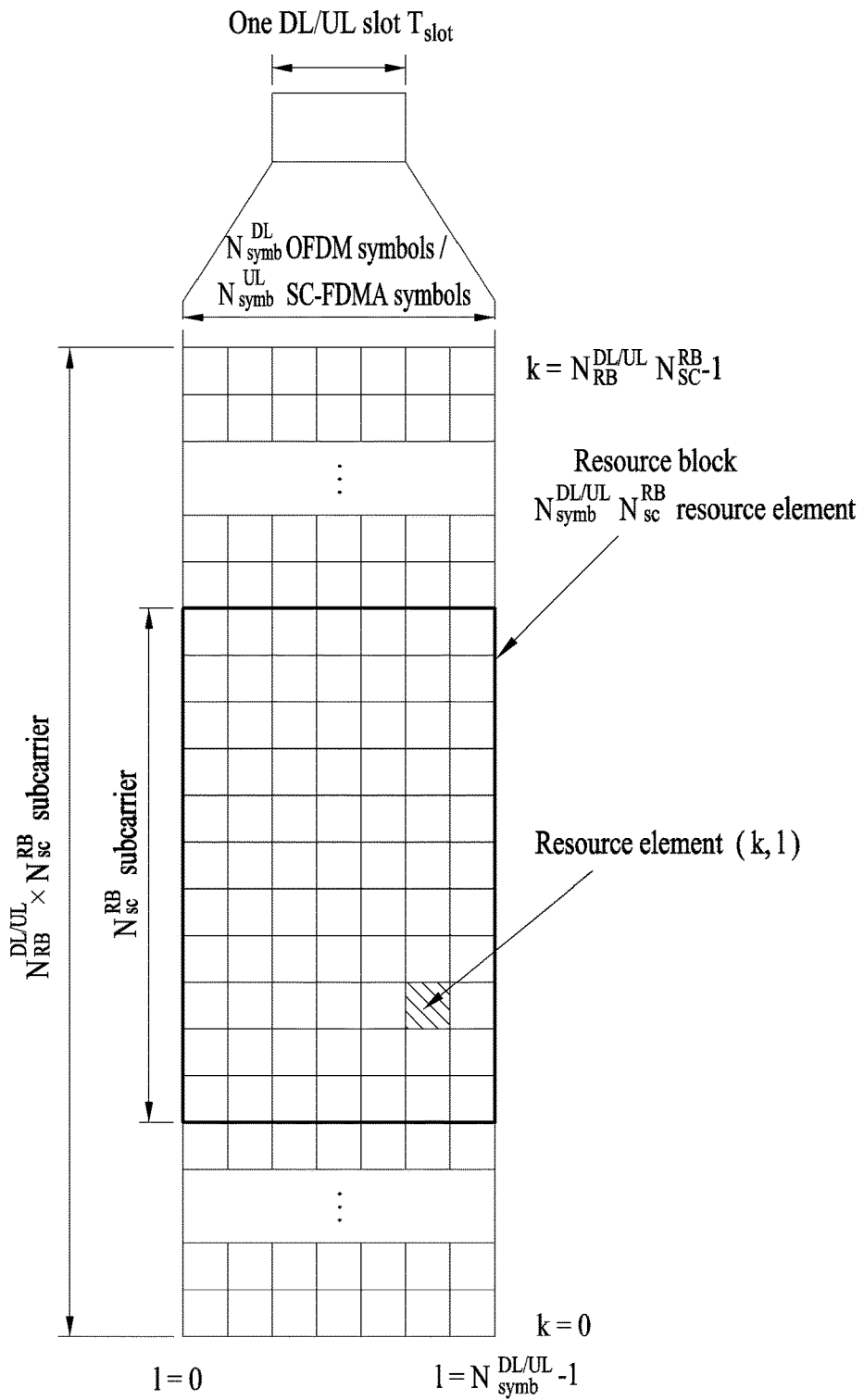
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and 1 is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
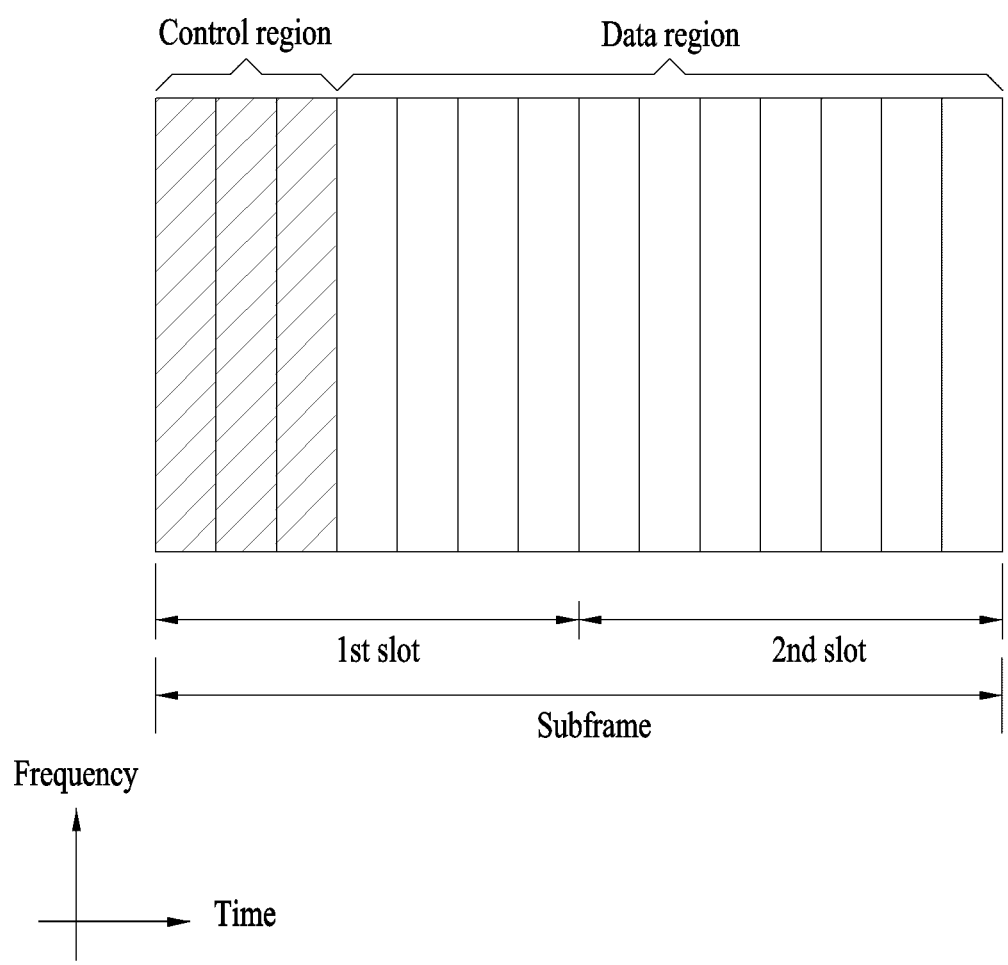
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space Aggregation Level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |

TABLE 3-continued

| Type | Search Space Aggregation Level L | Size [in CCEs] | Number of PDCCH candidates $M^{(L)}$ |
|---|---|---|---|
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
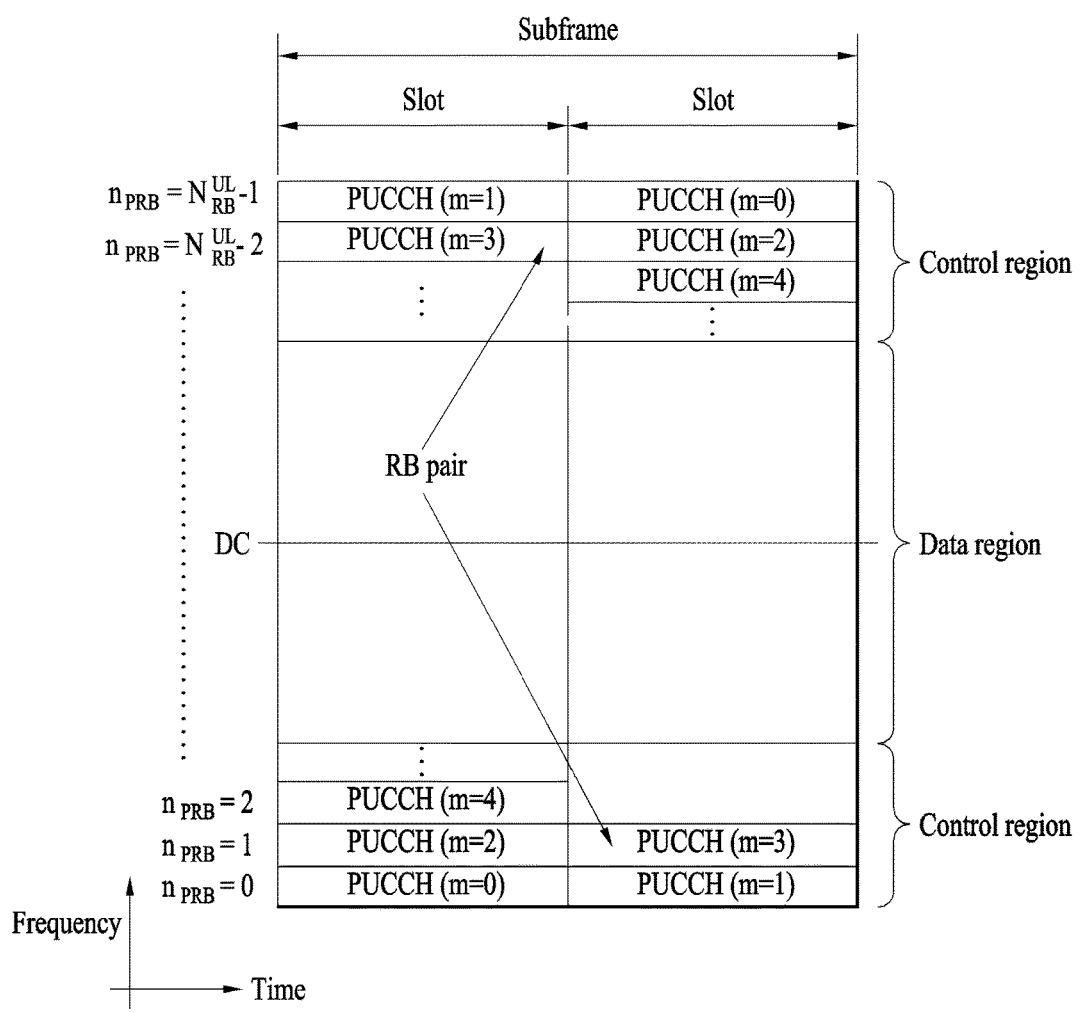
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

In general, in order for a network to obtain location information of a user equipment, various methods are used in a cellular communication system. As a representative method, in LTE Rel-9 system, an OTDOA (observed time difference of arrival) scheme that eNBs (evolved Node Bs) transmit a PRS signal to a user equipment and the user equipment estimates RSTD (reference signal time difference) from the PRS via a TDOA scheme and delivers the estimated RSTD to a network has been introduced.

[LTE Positioning Protocol]

In LTE system, an LPP (LTE positioning protocol) is defined to support the OTDOA scheme and the LPP informs a user equipment of OTDOA-ProvideAssistanceData including a configuration described in the following as an IE (information element).

---

--ASN1START
  OTDOA-ProvideAssistanceData ::= SEQUENCE {
   otdoa-ReferenceCellInfo OTDOA-ReferenceCellInfoOPTIONAL,-- Need ON
   otdoa-NeighbourCellInfo         OTDOA-NeighbourCellInfoListOPTIONAL,-- Need ON
   otdoa-Error OTDOA-Error OPTIONAL, -- Need ON
   ...
  }
--ASN1STOP

---

In this case, otdoa-ReferenceCellInfo indicates a reference cell for measuring RSTD and the otdoa-ReferenceCellInfo is configured as follows.

```
--ASN1START
    OTDOA-ReferenceCellInfo ::= SEQUENCE {
    physCellId INTEGER (0..503),
    cellGlobalId ECGI OPTIONAL, -- Need ON
    earfcnRef  ARFCN-ValueEUTRA  OPTIONAL, --    Cond
NotSameAsServ0
    antennaPortConfig ENUMERATED {ports1-or-2, ports4, ... }
    OPTIONAL, -- Cond NotSameAsServ1
    cpLength ENUMERATED { normal, extended, ... },
    prsInfo PRS-Info OPTIONAL,    -- Cond PRS
    ...,
    [[ earfcnRef-v9a0 ARFCN-ValueEUTRA-v9a0 OPTIONAL -- Cond
NotSameAsServ2
    ]]
    }
--ASN1STOP
```

Meanwhile, otdoa-NeighbourCellInfo indicates a target cell (e.g., eNB or TP) for measuring RSTD and can include information on maximum 24 neighboring cells according to each frequency layer among maximum 3 frequency layers. In particular, the otdoa-NeighbourCellInfo can inform a user equipment of information on 72 (3*24) cells in total.

```
--ASN1START
    OTDOA-NeighbourCellInfoList   ::=  SEQUENCE  (SIZE
(1..maxFreqLayers)) OF OTDOA-NeighbourFreqInfo
    OTDOA-NeighbourFreqInfo   ::=   SEQUENCE   (SIZE   (1..24))
OF OTDOA-NeighbourCellInfoElement
    OTDOA-NeighbourCellInfoElement ::= SEQUENCE {
    physCellId INTEGER (0..503),
    cellGlobalId ECGI OPTIONAL,   --Need ON
    earfcn ARFCN-ValueEUTRA   OPTIONAL,  --       Cond
NotSameAsRef0
    cpLength ENUMERATED {normal, extended, ...}
    OPTIONAL, -- Cond NotSameAsRef1
    prsInfo PRS-Info OPTIONAL, -- Cond NotSameAsRef2
    antennaPortConfig ENUMERATED {ports-1-or-2, ports-4, ...}
    OPTIONAL, -- Cond NotsameAsRef3
    slotNumberOffset INTEGER  (0..19)  OPTIONAL,--      Cond
NotSameAsRef4
    prs-SubframeOffset INTEGER (0..1279) OPTIONAL,  --    Cond
InterFreq
    expectedRSTD INTEGER (0..16383),
    expectedRSTD-Uncertainty INTEGER (0..1023),
    ...,
    [[ earfcn-v9a0 ARFCN-ValueEUTRA-v9a0 OPTIONAL --     Cond
NotSameAsRef5
    ]]
    }
    maxFreqLayers INTEGER ::= 3
--ASN1STOP
```

In this case, PRS-Info corresponding to IE included in the OTDOA-ReferenceCellInfo and the OTDOA-NeighbourCellInfo includes PRS information. Specifically, the PRS information includes PRS Bandwidth, PRS Configuration Index ($I_{PRS}$), Number of Consecutive Downlink Subframes, and PRS Muting Information. The PRS information is configured as follows.

```
PRS-Info ::= SEQUENCE {
prs-Bandwidth  ENUMERATED { n6, n15, n25, n50, n75, n100, ... },
prs-ConfigurationIndex INTEGER (0..4095),
numDL-Frames ENUMERATED {sf-1, sf-2, sf-4, sf-6, ...},
...,
prs-MutingInfo-r9 CHOICE {
po2-r9 BIT STRING (SIZE(2)),
po4-r9 BIT STRING (SIZE(4)),
po8-r9 BIT STRING (SIZE(8)),
po16-r9 BIT STRING (SIZE(16)),
...
} OPTIONAL -- Need OP
}
--ASN1STOP
```

Figure 5:
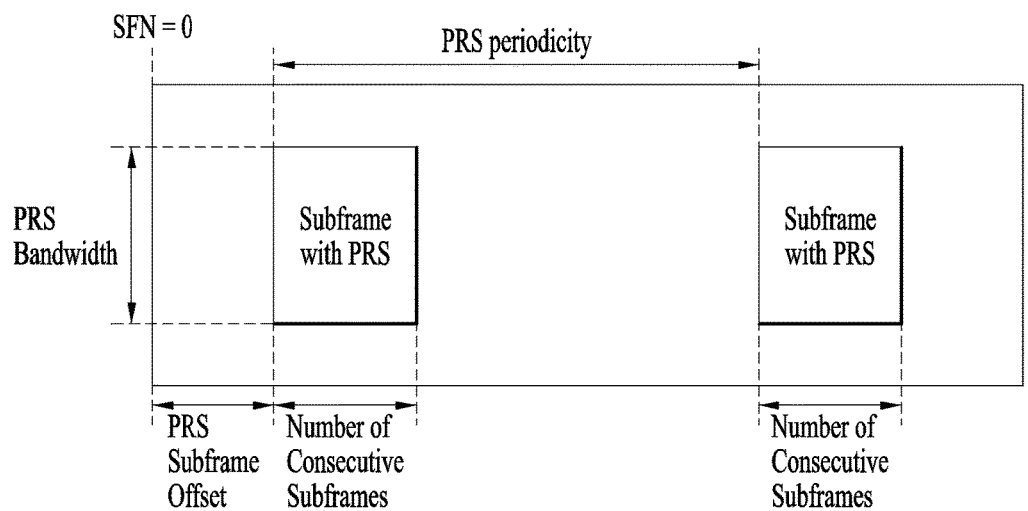
FIG. 5 is a diagram for a PRS transmission structure.

FIG. 5 is a diagram for a PRS transmission structure according to the aforementioned parameters.

In this case, PRS Periodicity and PRS Subframe Offset are determined according to a value of PRS Configuration Index ($I_{PRS}$) and a corresponding relation is shown in the following table.

TABLE 5

| PRS Configuration Index ($I_{PRS}$) | PRS Periodicity (subframes) | PRS Subframe Offset (subframes) |
| --- | --- | --- |
| 0-159 | 160 | $I_{PRS}$ |
| 160-479 | 320 | $I_{PRS} - 160$ |
| 480-1119 | 640 | $I_{PRS} - 480$ |
| 1120-23399 | 1280 | $I_{PRS} - 1120$ |

[PRS (Positioning Reference Signal)]

Figure 6:
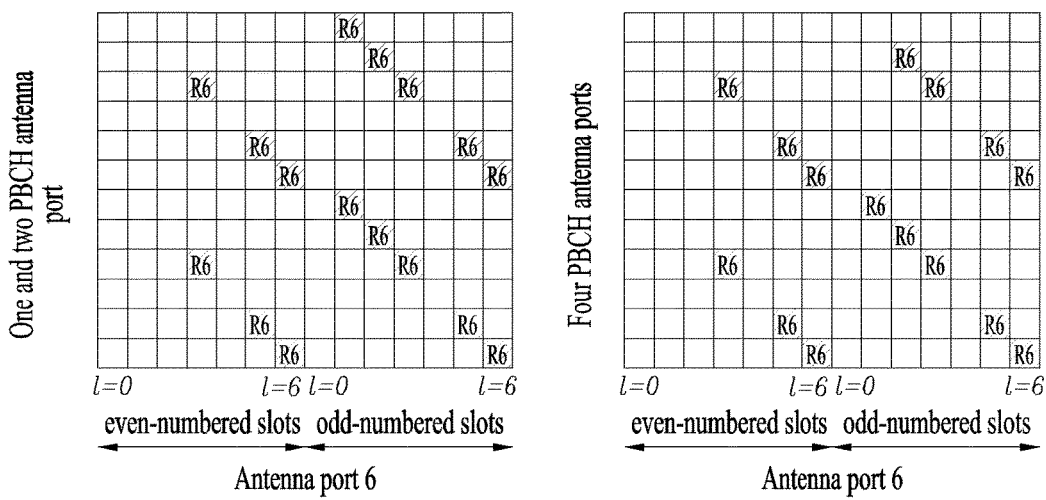
FIGS. 6 and 7 are diagrams for RE mapping of a PRS (positioning reference signal)
Figure 7:
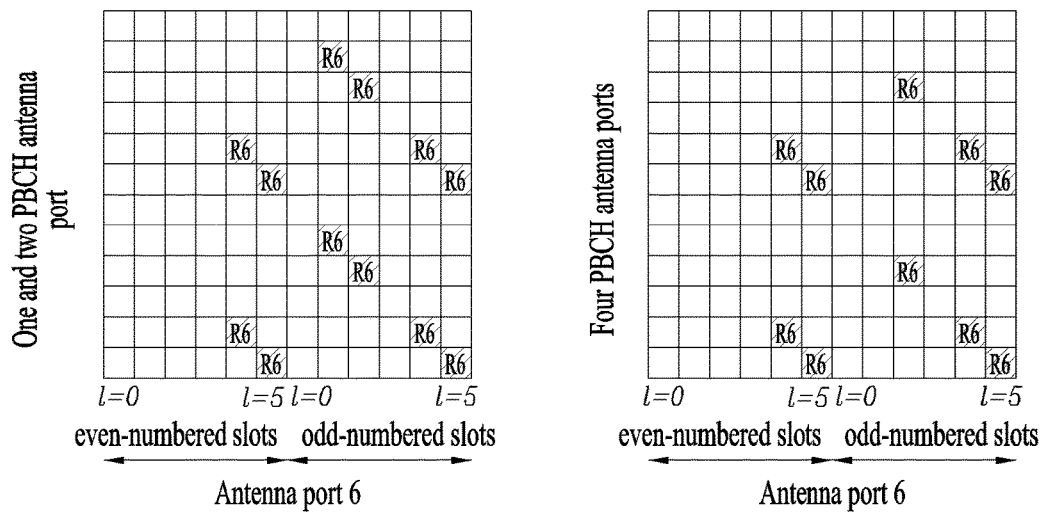

A PRS has a transmission occasion (i.e., positioning occasion) with a period of 160, 320, 640, or 1280 ms and the PRS can be transmitted during N number of contiguous DL subframes in the positioning occasion. In this case, the N may have a value selected from the group consisting of 1, 2, 4, and 6. Although the PRS is practically transmitted in the positioning occasion, the PRS can be muted for inter-cell interference controlling coordination. Information on the PRS muting is signaled to a UE using prs-MutingInfo. Unlike a system bandwidth of a serving eNB, a bandwidth on which the PRS is transmitted can be independently configured. The PRS is transmitted on a frequency band of 6, 15, 25, 50, 75, or 100 RBs (resource blocks). A transmission sequence of the PRS is generated by initializing a pseudo-random sequence generator in every OFDM symbol using such a function as a slot index, an OFDM symbol index, a CP (cyclic prefix) type, and a cell ID. As shown in FIG. 6 (normal CP) and FIG. 7 (extended CP), the generated transmission sequences of the PRS are mapped to resource elements (REs) according to a normal CP or an extended CP. A position of an RE to which the transmission sequence of the PRS is mapped may shift on a frequency axis. A shift value can be determined by a cell ID. A position of a PRS transmission RE shown in FIGS. 6 and 7 shows a case that frequency shift corresponds to 0.

A UE receives configuration information on a list of PRSs to be searched from a location management server of a network to measure the PRSs. The configuration information includes PRS configuration information of a reference cell and PRS configuration information of neighboring cells. Each of the PRS configuration information includes an occurrence cycle of a positioning occasion and offset, the number of contiguous DL subframes constructing a positioning occasion, a cell ID used for generating a PRS sequence, a CP type, the number of CRS antenna ports considered when PRS is mapped, and the like. In addition to this, the PRS configuration information of the neighboring cells includes a slot offset and a subframe offset between a neighboring cell and a reference cell, an anticipated RSTD, and the extent of uncertainty of the anticipated RSTD to support a UE to determine timing and a time window for detecting a PRS transmitted from the neighboring cell.

Meanwhile, the RSTD corresponds to a relative timing difference between an adjacent or neighboring cell j and a reference cell i. In particular, the RSTD can be represented as $T_{subframeRxj}-T_{subframeRxi}$. In this case, the $T_{subframeRxj}$ corresponds to timing at which a UE receives the start of a specific subframe from the neighboring cell j and the $T_{subframeRxi}$ corresponds to timing at which the UE receives the start of a subframe corresponding to the specific subframe from the reference cell i. The timing corresponds to timing nearest from the specific subframe received from the neighboring cell j in time. A reference point for an examined subframe time difference corresponds to an antenna connector of the UE.

Although the aforementioned legacy positioning schemes are already supported by 3GPP UTRA and E-UTRA standard (e.g., LTE Rel-9), recently, higher accuracy is required for an in-building positioning scheme. In particular, although the legacy positioning schemes correspond to a technology capable of being commonly applied to outdoor/indoor environment, in case of using E-CID scheme, it is known as a general positioning accuracy of the technology is 150 m and 50 m in NLOS (non-LOS) environment and LOS environment, respectively. And, OTDOA scheme based on a PRS also has a limitation point that a positioning error exceeds 100 m due to an eNB synchronization error, an error caused by multipath propagation, an RSTD measurement quantization error of a UE, a timing offset estimation error, and the like. And, in case of an A-GNSS scheme, since the A-GNSS scheme requires a GNSS receiver, the A-GNSS scheme has a limitation point in terms of complexity and battery consumption and has a restriction in utilizing the A-GNSS scheme for in-building positioning.

In the present specification, a method for a base station end to calculate location information of a UE is considered. Basically, a cellular network transmits a specific pilot signal (e.g., a form of a specific reference signal capable of being separately identified according to each base station/TP (transmission point)) to a UE, the UE calculates a positioning-related estimation value (e.g., OTDOA and RSTD estimation value) estimated by a specific positioning scheme by measuring each pilot signal, and the UE reports the calculated estimation value to a base station.

According to the LTE standard, as shown in FIGS. 6 and 7, a PRS is designed to calculate a positioning-related estimation value of UE in a manner of being set to a single antenna port. Yet, as mentioned in the foregoing description, in order to more enhance positioning accuracy, it may consider a method of transmitting a PRS from a plurality of antenna ports. The present specification proposes a detail method of transmitting a PRS from a plurality of antenna ports.

Meanwhile, in 3GPP LTE Rel-11 system, network management of CA (carrier aggregation) environment that utilizes a plurality of frequency bands by combining the frequency bands has been considered. A carrier corresponding to each frequency band is defined as a CC (component carrier) and maximum 5 CCs can be combined with each other. A cell managing system information is defined as a Pcell (primary cell) and other cells are defined as Scells (secondary cells). A carrier corresponding to the Pcell is defined as a PCC (primary CC). In this case, the Scells can be set to a UE supporting a CA technique via Scell configuration which is delivered by a higher layer signal and an ACK/NACK feedback channel is set to the UE all the time in response to Scells included in the Scell configuration. Yet, actual data transmission and reception follows activation/deactivation configuration delivered via a MAC layer and data transmission and reception are performed for activated Scell only.

It is able to transmit a PRS on a plurality of CCs in an identical cell using the CA technique. If a UE is able to know that a PRS is transmitted on a wider band by the CA technique, it is able to expect that the UE is able to estimate an RSTD of a higher resolution. Hence, the present invention considers a method that a base station informs a UE of co-location information among a plurality of CCs and the UE performs a positioning scheme by utilizing the co-location information. In the following, operations of LTE system are explained as a detail embodiment of operations proposed by the present invention.

eNB Operation (1.1) Co-Location Information

According to concrete embodiment of the present invention, when an eNB informs a UE of IE for positioning, ID (identity) information on a geographic position represented by N bits can be included in the IE.

If the eNB provides an ID for identifying a geographic position of each cell to the UE to inform the UE of co-location information between cells, the UE can determine that cells including an identical ID are co-located, i.e., the cells are located at an identical geographic position, and the UE can utilize the information for positioning. An LTE system to which the embodiment of the present invention is applied defines a PCI (physical cell identity) corresponding to an ID for identifying cells transmitting signals in a PHY layer and ECGI (enhanced cell global identity) corresponding to a unique ID for identifying cells of the whole world. Yet, in the LTE system, CCs different from each other managed by the CA technique in an identical eNB are recognized as cells different from each other. Hence, the PCI and the ECGI may have a different value according to a CC. Hence, the present invention proposes a method of defining a separate ID for identifying a geographic position as a GCI (geographical cell ID) and a method of including the GCI in IE for positioning informed to the UE. As an example, as shown in the following example, the GCI information can be included in OTDOA-ReferenceCellInfo and OTDOA-NeighbourCellInfo.

```
--ASN1START
OTDOA-ReferenceCellInfo ::= SEQUENCE {
physCellId INTEGER (0..503),
geoCellId INTEGER (0..2N), OPTIONAL,
...
}
--ASN1STOP
--ASN1START
OTDOA-NeighbourCellInfoElement ::= SEQUENCE {
physCellId INTEGER (0..503),
geoCellId INTEGER (0..2N), OPTIONAL,
...
}
--ASN1STOP
```

Figure 8:
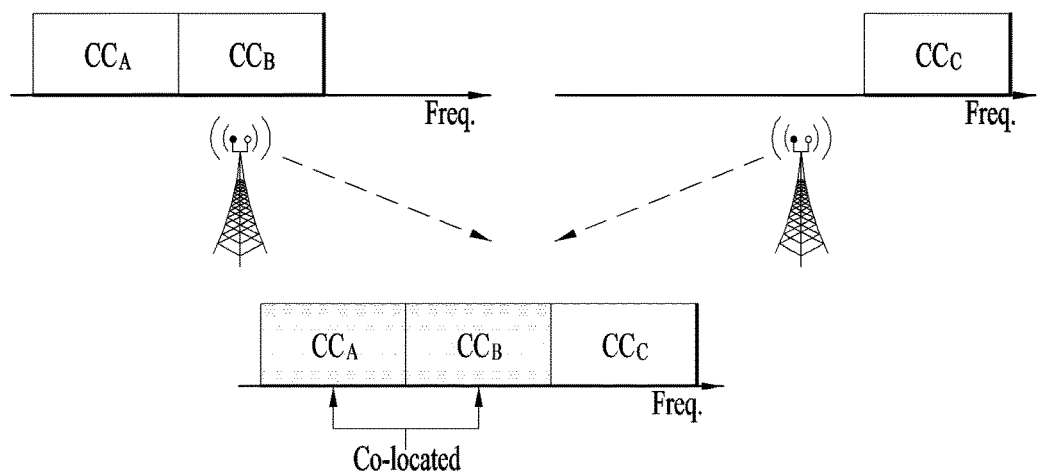
FIG. 8 is a diagram for a co-located CC (component carrier) or a cell according to one embodiment of the present invention.

FIG. 8 is a diagram for a concept of co-location.

(1.2) Method of Transmitting PRS on Co-Located CC (1.2.1) Aggregated PRS Transmission According to concrete embodiment of the present invention, an eNB can transmit a PRS on the M number of co-located CCs to which contiguous CA technique is applied and can transmit an aggregated PRS sequence. If a plurality of CCs are combined by the contiguous CA technique, a UE can receive a signal on a wider frequency band in proportion to the number of combined CCs. In this case, preferably, if a single PRS is transmitted on the CCs combined by the contiguous CA technique, it may be able to enhance resolution of TDOA estimation. Hence, according to one embodiment of the present invention, when the number of RBs configured to transmit data on each CC corresponds to $N_{RB}$ and a resource at which virtual subcarriers exist between two adjacent CCs connected by the contiguous CA technique corresponds to $N_{RB,\ V}$, it is able to configure the eNB to generate and transmit a PRS sequence aggregated for $N_{RB,\ agg}=M*N_{RB}+(M-1)*N_{RB,\ V}$. In this case, although the PRS sequence is generated in consideration of the resource at which the virtual subcarriers exist, an actual PRS is not transmitted on the virtual subcarrier. As an example, an aggregated PRS sequence in the LTE system can be designed as follows.

A reference-signal sequence $r_{l,ns}(m)$ is defined by equation described in the following.

$$r_{1,ns}(m) = \frac{1}{\sqrt{2}}(1-2\cdot c(2m)) + j\frac{1}{\sqrt{2}}(1-2\cdot c(2m+1)),$$ [Equation 1]

$$m = 0, 1, \ldots, 2N_{RB,agg}-1$$

In this case, $n_s$ corresponds to a slot number in a radio frame and l corresponds to an OFDM symbol number in the slot. A pseudo-random sequence c(i) is defined as described in the following. The pseudo-random sequence is initialized by $c_{init}=2^{16}\cdot((7\cdot(n_s+1)+l+1)\cdot(2\cdot N_{ID,\ agg}+1)+2\cdot N_{ID,\ agg}+N_{CP}$ at the start point of each OFDM symbol. In this case, $N_{ID,agg}$ corresponds to a value for initializing an aggregated PRS sequence. The $N_{ID,agg}$ can be given by PCI of Pcell including lowest CC index among CCs aggregated by the contiguous CA technique or the aforementioned GCI according to one embodiment of the present invention. The $N_{CP}$ can be represented as follows.

$$N_{CP} = \begin{cases} 1 & \text{for normal } CP \\ 0 & \text{for extended } CP \end{cases}$$ [Equation 2]

The pseudo-random sequence c(i) is defined by a gold sequence of length-31. An output sequence of length-$M_{PN}$ is defined as follows. In this case, n corresponds to 0, 1, . . . , $M_{PN}$-1.

$$c(n)=(x_1(n+N_C)+x_2(n+N_C))\bmod 2$$

$$x_3(n+31)=(x_3(n+3)+x_1(n))\bmod 2$$

$$x_2(n+31)=(x_2(n+3)+x_2(n+2)+x_2(n+1)+x_2(n))\bmod 2$$ [Equation 3]

In this case, Nc corresponds to 1600 and a first m-sequence is initialized by $x_1(0)=1$, $x_1(n)=0$, n=1, 2, . . . , 30. Initialization of a second m-sequence is referred to as $c_{init}=\sum_{i=0}^{30} x_2(i)\cdot 2^i$ together with a value depending on sequence application.

Figure 9:
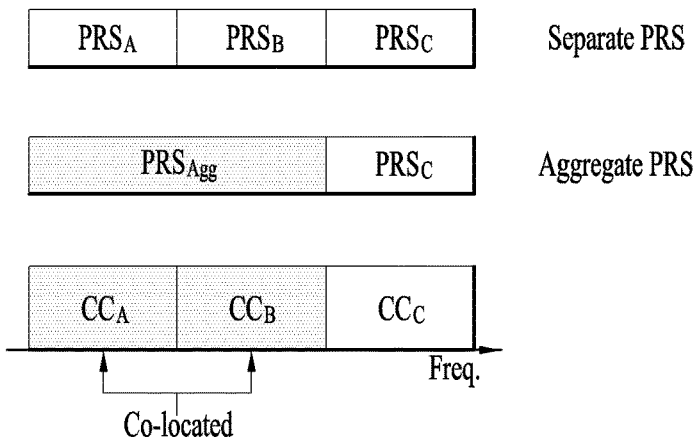
FIG. 9 is a diagram for a PRS (positioning reference signal) transmitted from a co-located CC (component carrier) or a cell according to one embodiment of the present invention.

FIG. 9 is a diagram for an aggregated PRS sequence on frequency domain according to one embodiment of the present invention.

According to a different embodiment of the present invention, when the aggregated PRS (or a CA-based PRS) is transmitted, as an additional operation, an eNB can separately configure CP (cyclic prefix) information or CRS antenna port information applied to the aggregated PRS (or CA-based PRS).

Specifically, the eNB sets separate PRS-Info to the aggregated PRS (or the CA-based PRS) and, as shown in the following, the eNB can separately configure CP information or CRS antenna port information in the PRS-Info.

```
--ASN1START
PRS-Info ::= SEQUENCE {
  prs-Bandwidth   ENUMERATED { n6, n15, n25, n50, n75, n100, ...
},
  prs-ConfigurationIndex  INTEGER (0..4095),
  numDL-Frames ENUMERATED {sf-1, sf-2, sf-4, sf-6, ...},
  ...,
  prs-MutingInfo-r9 CHOICE {
    po2-r9         BIT STRING (SIZE(2)),
    po4-r9         BIT STRING (SIZE(4)),
    po8-r9         BIT STRING (SIZE(8)),
    po16-r9        BIT STRING (SIZE(16)),
    ...
  } OPTIONAL -- Need OP
  cpLength ENUMERATED { normal, extended, ... }, OPTIONAL,
  antennaPortConfig ENUMERATED {ports1-or-2, ports4, ...
},
OPTIONAL,
  }
--ASN1STOP
```

Or, a UE may assume a CP for the aggregated PRS (or the CA-based PRS) according to a scheme promised between the eNB and the UE in advance. For example, the UE receives IE for positioning a plurality of cells (i.e., CCs) corresponding to the aggregated PRS (or the CA-based PRS) and may be then able to perform operations described in the following based on CP information (or CRS antenna port information) in the IE.

A. If a primary cell (or CC) exists among CCs on which an aggregated PRS (or a CA-based PRS) is transmitted, assume that a CP of IE for the primary cell is applied to the aggregated PRS (or the CA-based PRS). If a primary cell does not exist, assume that a CP (or CRS antenna port configuration) of IE for a CC including a lowest cell index among secondary cells (or CCs) is applied to the aggregated PRS (or a CA-based PRS).

B. If a CC preconfigured by a serving eNB of a UE exists among CCs on which an aggregated PRS is transmitted, assume that a CP (or CRS antenna port configuration) of IE for the CC is applied to the aggregated PRS (or CA-based PRS).

C. If CP (or CRS antenna port configuration) information exists at IE for a specific CC only among CCs on which an aggregated PRS is transmitted, a UE assumes that a CP (or CRS antenna port configuration) of the specific CC is applied to CP (or CRS antenna port configuration) of the remaining CCs.

D. If one or more CCs have an extended CP among CCs on which an aggregated PRS (or CA-based PRS) is transmitted, assume that a CP for the aggregated PRS (or CA-based PRS) corresponds to an extended CP.

In this case, the CCs on which the aggregated PRS (or CA-based PRS) is transmitted can apply an extended CP to SFs in which the aggregated PRS (or CA-based PRS) is transmitted only.

E. Assume that the number of CRS antenna port of CCs on which an aggregated PRS (or CA-based PRS) is transmitted corresponds to 1.

F. If CPs of CCs on which an aggregated PRS (or CA-based PRS) is transmitted are not the same, assume that the transmission of the aggregated PRS (or CA-based PRS) is not valid.

Or, if a UE is configured to estimate RSTD for a plurality of cells including a co-located identifier (e.g., GCI), the UE receives IE for positioning a plurality of the cells and may be then able to perform operations described in the following based on CP information (or CRS antenna port information) included in each IE.

A. If a primary cell exists among a plurality of cells including a co-located identifier, assume that CP information (or CRS antenna port configuration) of the primary cell is commonly applied to PRSs of a plurality of the co-located cells.

B. If a cell preconfigured by a serving eNB of a UE exists among a plurality of cells including a co-located identifier, assume that CP (or CRS antenna port configuration) information of IE for the cell is commonly applied to PRSs of a plurality of the co-located cells.

C. If CP (or CRS antenna port configuration) information exists at IE of a specific cell only among a plurality of cells including a co-located identifier, a UE assumes that CP (CRS antenna port configuration) of the specific cell is applied to CPs (or CRS antenna port configuration) of the remaining cells.

D. If one or more cells have an extended CP among a plurality of cells including a co-located identifier, assume that an extended CP is commonly applied to a plurality of the co-located cells.

In this case, a plurality of the cells including the co-located identifier can transmit a PRS at the same time and an extended CP can be applied to SFs in which the PRS is transmitted only.

E. Assume that the number of CRS antenna port for a plurality of cells including a co-located identifier corresponds to 1.

F. If CP information (or CRS antenna port information) of a plurality of cells including a co-located identifier are not the same, assume that each PRS is unable to utilize a co-location characteristic. In particular, a UE assumes that a plurality of the cells are not co-located and performs such an operation as RSTD measurement and the like by utilizing a PRS according to a cell without the support of the co-location information.

And, as an additional operation of the present invention, when a UE performs such an operation as single RSTD measurement and the like by utilizing PRSs transmitted from a plurality of co-located cells, a serving eNB of the UE can inform the UE of information on a measurement section where an operation of generating a single measurement value (e.g., RSTD) by utilizing the PRSs transmitted from a plurality of the co-located cells is valid. For example, the eNB sets a section ranging from specific timing t to t+$T_o$ to the UE and the UE is able to generate a single measurement value by utilizing a plurality of PRSs (or PRS sequence) transmitted from a plurality of the cells including an identical co-located identifier in the section.

(1.2.2) GCI or VCI (Virtual Cell Identity)-Based PRS Sequence Generation

The present invention proposes a method for an eNB to initialize and generate a PRS sequence based on GCI or VCI (virtual cell identity) instead of PCI according to a different embodiment of the present invention.

Although the aforementioned method of transmitting an aggregated PRS according to one embodiment of the present invention is valid for CA-capable UEs, which have obtained a wider frequency band by a contiguous CA scheme, the method has a demerit in that it is unable to utilize the method for legacy UEs prior to Rel-10. Yet, in case of a separate PRS, if FS (frequency shift) is applied to an identical PRS, it may be able to enhance resolution of correlation between transmitted and received PRS. For example, if $y_m[n]$ is induced by applying FS to an $m^{th}$ reference signal x[n] as much as $k_m$ and applying FS to a signal received via a channel of a receiver as much as $-k_m$, it may be able to represent the $y_m[n]$ as equation described in the following.

$$Y_m[k-k_m] = X[k]H[k-k_m] + \Gamma[k-k_m] \to y_m[n] = \quad \text{[Equation 4]}$$
$$x[n] \circ \left( h[n]e^{j\frac{2\pi k_m n}{N}} \right) + \tilde{\gamma}[n]$$

In this case, n corresponds to a time axis index of a discrete time domain, ∘ corresponds to circular convolution, $\tilde{\gamma}[n]$ corresponds to noise and interference, and X[k], Y[k], and H[k] correspond to DFT conversion of x[n], y[n], and h[n], respectively. As an example, the X[k] can be defined as follows.

$$X[k] = \sum_{n=0}^{N-1} x[n]e^{-j\frac{2\pi k n}{N}} \quad \text{[Equation 5]}$$

Subsequently, correlation between $y_m[n]$ and x[n] can be obtained as follows.

$$C_m = \sum_{n=0}^{N-1} \left( h[n]e^{j\frac{2\pi k_m n}{N}} \right) \cdot (x[n]^* \circ x[-n]) \quad \text{[Equation 6]}$$

In this case, if correlations for the M number of RS signals are summed up, final correlation C can be obtained as follows.

$$C = \sum_{m=0}^{M-1} C_m \quad \text{[Equation 7]}$$
$$= \sum_{n=0}^{N-1} \left( \sum_{m=0}^{M-1} h[n]e^{j\frac{2\pi k_m n}{N}} \right) \cdot (x[n]^* \circ x[-n])$$
$$= \sum_{n=0}^{N-1} h[n] \cdot \left( \sum_{m=0}^{M-1} e^{j\frac{2\pi k_m n}{N}} \right) \cdot u[n]$$
$$= \sum_{n=0}^{N-1} h[n] \cdot f[n] \cdot u[n]$$

In this case, u[n]=x[n]° ∘ x[−n] indicates auto-correlation for an RS sequence. In this case, f[n], which is generated by the sum of FS and correlation, plays a role of a filter in time domain. In a frequency axis, there may exist the M number of restricted filter taps. Each tap is represented by a form having 1 as a filter coefficient.

Assume that an FFT size for a single CC corresponds to N and x[n] is transmitted using a Zadoff-Chu sequence of length-N. Then, auto-correlation of the x[n] has resolution of a time unit corresponding to 1/N of an OFDM symbol length. In this case, assume that two CCs are connected with each other by contiguous CA techniques, there exist 2N number of subcarriers, and x[n] is transmitted on each of the CCs. Then, the x[n] can be interpreted as a case that FS corresponds to 0 and a case that FS corresponds to N exist in terms of 2N FFT size. When correlations of both cases are summed up, the f[n] can be represented as equation described in the following.

$$f[n]=1+e^{j\pi n} \quad \text{[Equation 8]}$$

In Equation 8, f[n] has a value of 0 in odd number time in terms of 2N FFT size. Consequently, a value of correlation at the timings (k+1)/(2N), k=0, 1, 2, ... , becomes 0. Hence, it is able to enhance resolution in a 1/(2N) time unit of an OFDM symbol.

The aforementioned operation is performed to obtain an effect of applying FS by transmitting an identical PRS to each of CCs to which contiguous CA techniques are applied. Yet, since CCs different from each other can be configured to have a different PCI for the management purpose in LTE system and the PRS uses PCI as a parameter for initializing sequence generation, a method of smoothly generating a PRS sequence is not supported. Hence, as mentioned in the foregoing example, the present invention proposes a method for an eNB to initialize and generate a PRS sequence based on GCI or VCI instead of PCI to transmit an identical PRS while having an individual PRS structure in the contiguous CA. An example of adding the VCI information to PRS-Info IE is described in the following.

```
--ASN1START
PRS-Info ::= SEQUENCE {
  prs-ID   INTEGER (0.. 503),
  ...,
}
--ASN1STOP
```

(2) UE Operation
(2.1) Priority of Measuring Neighboring Cell
(2.1.1) Priority of Measuring Co-Located CCs According to concrete embodiment of the present invention, when a UE receives co-location information between cells regarding information on neighboring cells among IE for positioning, priority for measuring a specific cell may follow priority of a cell including highest priority among a cell and a co-located cell.

In LTE system to which one embodiment of the present invention is applied, information on maximum 24 neighboring cells is delivered to each of maximum 3 frequency layers, which become an RSTD measurement target, via otdoa-NeighbourCellInfo. In this case, when the measurement is performed, a UE sets priority according to a frequency layer and it is able to configure a most precedent neighboring cell in a list to have higher priority in the same frequency layer.

If the target device is capable of supporting additional neighbor cells (as indicated by the presence of the IE additionalNeighbourCellInfoList in OTDOA-ProvideCapabilities), the list may contain all cells (up to 3×24 cells) belonging to the same frequency layer or cells from different frequency layers with the first cell in the list still being the highest priority for measurement.

Yet, if co-location information is provided according to one embodiment of the present invention, since cells located at a different frequency layer practically have an identical geographic location, it may be more reasonable to provide identical priority. Hence, the present invention proposes an operation that a value of a cell of highest measurement priority is regarded as priority for measuring co-located cells.

(2.1.2) Measurement Priority Among Co-Located CCs

According to concrete embodiment of the present invention, when a UE receives co-location information between cells regarding information on neighboring cells among IE for positioning, priority for measuring co-located cells can be set according to RSRQ (reference signal received quality) in descending order. In particular, a UE may assign higher priority to a cell that RSRQ is higher. According to the aforementioned embodiment of the present invention, priority for measuring a set of co-located CCs may follow priority of a cell including highest measurement priority among cells belonging to the set. In this case, it is also necessary to define a priority relation in the set. The present embodiment proposes a method of assigning higher priority to a band of better interference environment, i.e., a band of less interference, based on the fact that the co-located cells are configured by CCs distinguished from each other by a frequency band. As an example, a UE may utilize RSRQ as an indicator for interference environment.

(2.2) Priority Among PRS Muting Information, Scell on/Off, and SCell Activation/Deactivation According to concrete embodiment of the present invention, when PRS muting information, information on Scell On/Off, and information on Scell activation/deactivation are set to a UE supporting CA technique, the present invention proposes a method of assigning high priority in an order of the information on Scell On/Off, the PRS muting information, and the information on Scell activation/deactivation. LTE Rel-12 considers an operation of turning Scells on/off according to traffic load to reduce the impact of inter-cell interference. In particular, an offed Scell can transmit a DRS (discovery reference signal) only. A PRS is not transmitted as well. Hence, a UE assumes that a PRS is not transmitted to an offed cell irrespective of the PRS muting information. On the contrary, the information on Scell activation/deactivation corresponds to a signal used for indicating that data of a UE is not transmitted from a corresponding cell. A PRS can be transmitted from a deactivated cell. Hence, in this case, the UE is able to recognize whether or not a PRS is transmitted from a corresponding cell based on the PRS muting information only.

Figure 10:
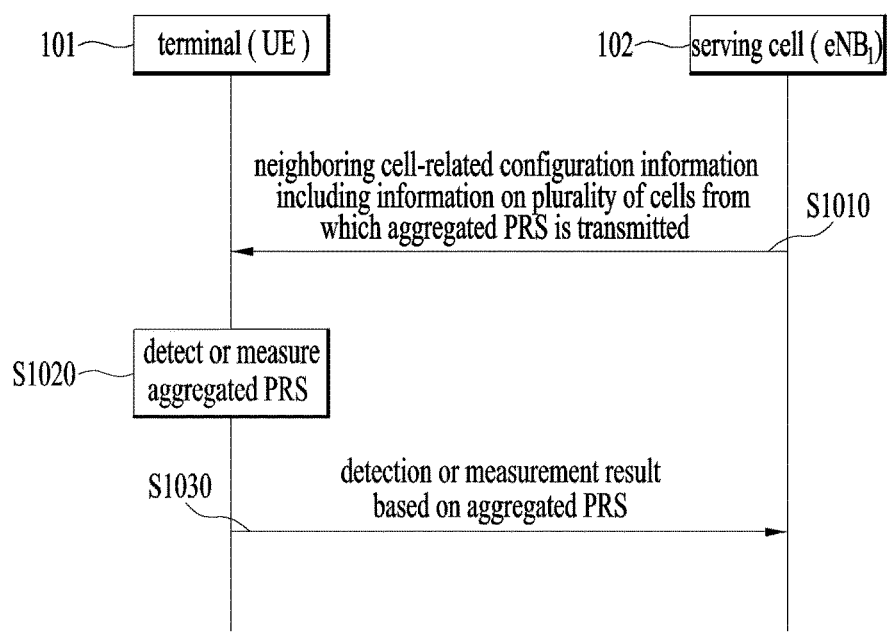
FIG. 10 is a flowchart for an operation according to one embodiment of the present invention.

FIG. 10 is a flowchart for an operation according to one embodiment of the present invention.

FIG. 10 shows a method of receiving a reference signal for location determination and performing measurement using the received reference signal in a wireless communication system.

A terminal 101 can receive neighbor cell-related information including information on a plurality of cells in which an aggregated PRS (positioning reference signal) is transmitted from a serving cell 102 [S1010]. The terminal can receive the aggregated PRS using the information on a plurality of the cells or can perform detection or measurement [S1020]. The aggregated PRS is transmitted from a plurality of the cells and the serving cell can be included in a plurality of the cells. And, the aggregated PRS corresponds to a sequence sharing an identical sequence initialization value and can be transmitted through a frequency band or a component carrier corresponding to a plurality of the cells. The identical sequence initialization value can include a unique identifier assigned to a plurality of the cells.

And, the unique identifier assigned to a plurality of the cells may be related to geographic location-related information among a plurality of the cells. In particular, since the aggregated PRS is used for determining a location and the aggregated PRS is transmitted on a wider frequency band to increase resolution of determining a location, a radio resource (i.e., frequency band) on which the aggregated PRS is transmitted should be received from a transmitter located at an identical or a very close geographic location. Hence, a plurality of the cells should be cells corresponding to geographic information within a very close range and the unique identifier assigned to a plurality of the cells is associated with the geographic information.

Additionally or alternately, information on a plurality of the cells can include the unique identifier assigned to a plurality of the cells. Additionally or alternately, the information on a plurality of the cells can include PRS configuration information of each of a plurality of the cells.

And, the PRS configuration information can include CP (cyclic prefix) length information of a cell and CRS (cell specific reference signal) antenna port configuration information.

When the CP length information or the CRS antenna port configuration information, which is included in the PRS configuration information on each of a plurality of the cells, is not the same, or the CP length information or the CRS antenna port configuration information is included in the PRS configuration information on a part of a plurality of the cells only, if there is a primary cell set to the terminal among a plurality of the cells, the terminal is able to determine that CP length information or CRS antenna port configuration information included in PRS configuration information of the primary cell is applied to the aggregated PRS. If the primary cell does not exist in a plurality of the cells, the terminal can determine that CP length information or CRS antenna port configuration information included in PRS configuration information of a cell including a lowest cell index among the remaining cells is applied to the aggregated PRS.

Or, if the CP length information or the CRS antenna port configuration information, which is included in the PRS configuration information on each of a plurality of the cells, is not the same, or the CP length information or the CRS antenna port configuration information is included in the PRS configuration information on a part of a plurality of the cells only, the terminal can determine that CP length information or CRS antenna port configuration information, which is included in PRS configuration information of a predetermined cell, is applied to the aggregated PRS.

Or, when the CP length information or the CRS antenna port configuration information, which is included in the PRS configuration information on each of a plurality of the cells, is not the same, or the CP length information or the CRS antenna port configuration information is included in the PRS configuration information on a part of a plurality of the cells only, if PRS configuration information on one or more cells among a plurality of the cells includes extended CP length information, the terminal can determined that an extended CP length is applied to the aggregated PRS. The extended CP length can be configured in a subframe in which the aggregated PRS is transmitted only.

Or, if the CP length information or the CRS antenna port configuration information, which is included in the PRS configuration information on each of a plurality of the cells, is not the same, or the CP length information or the CRS antenna port configuration information is included in the PRS configuration information on a part of a plurality of the cells only, the terminal can determine that transmission of the aggregated PRS is not valid.

Or, if PRS configuration information on a single cell among a plurality of the cells includes CP length information or CRS antenna port configuration information only, the terminal can determine that CP length information or CRS antenna port configuration information on the single cell is applied to the aggregated PRS.

And, if the CP length information or the CRS antenna port configuration information, which is included in the PRS configuration information on each of a plurality of the cells, is the same, the terminal can determine that transmission of the aggregated PRS is valid.

The terminal can receive information on a valid section for generating a single RSTD measurement value from the serving cell based on the aggregated PRS.

And, RSTD measurement priority for a plurality of the cells can be determined by highest RSTD measurement priority among a plurality of the cells. And, RSTD measurement priority for each of a plurality of the cells can be determined according to reception quality of an aggregated PRS received from each of a plurality of the cells.

Embodiments of the present invention are briefly explained in the foregoing description with reference to FIG. 10. The embodiments related to FIG. 10 can additionally or alternately include at least a part of the aforementioned embodiment(s).

Figure 11:
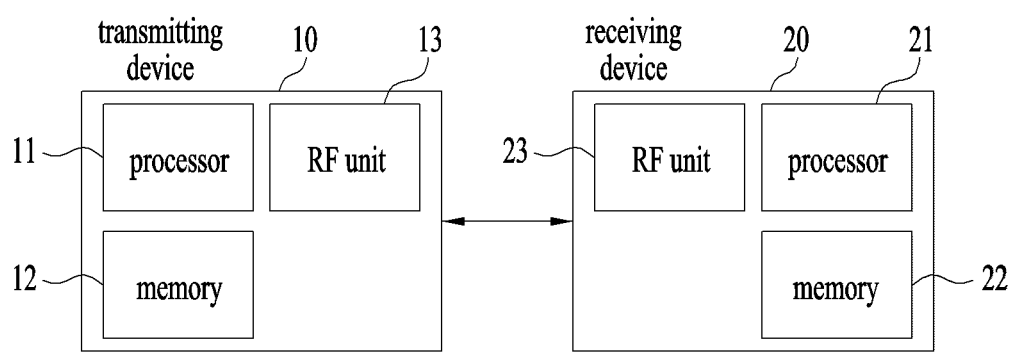
FIG. 11 is a block diagram of a device for implementing embodiment(s) of the present invention.

FIG. 11 is a block diagram of a transmitting device 10 and a receiving device 20 configured to implement exemplary embodiments of the present invention. Referring to FIG. 11, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

It will be apparent to those skilled in the art that various modifications and variations can be made in the present invention without departing from the scope of the inventions. Thus, it is intended that the present invention covers the modifications and variations of this invention provided they come within the scope of the appended claims and their equivalents.

INDUSTRIAL APPLICABILITY

The present invention is applicable to a wireless communication device such as a user equipment (UE), relay, or base station (BS).

What is claimed is:

1. A method of receiving a reference signal for positioning by a terminal in a wireless communication system, the method comprising:

receiving neighboring cell-related information including information on a plurality of cells corresponding to multiple sets of co-located component carriers (CCs), each of the multiple sets of co-located CCs being aggregated to transmit an aggregated positioning reference signal (PRS) within a bandwidth being proportional to a number of the aggregated CCs;

receiving aggregated PRSs from the multiple sets of co-located CCs, using the information on the plurality of cells; and measuring a reference signal time difference (RSTD) for the multiple sets using the received aggregated PRSs, wherein each sequence of the aggregated PRSs is initialized by a unique identifier assigned to a respective one of the multiple sets, and wherein the multiple sets have a RSTD measurement priority of a CC having a highest RSTD measurement priority among the co-located CCs in a respective set of co-located CC, and each of the co-located CCs in the respective set have a RSTD measurement priority being determined according to reference signal received quality (RSRQ) of the PRS received from the each of the co-located CCs.

2. The method of claim 1, wherein the information on the plurality of cells comprises the unique identifier assigned to the respective one of the multiple set.

3. The method of claim 1, wherein the information on the plurality of cells includes PRS configuration information on an aggregated PRS for each of the multiple sets, and wherein the PRS configuration information includes cyclic prefix (CP) length information and cell specific reference signal (CRS) antenna port configuration information of the aggregated PRS for each of the multiple sets.

4. The method of claim 1, wherein the information on the plurality of cells includes PRS configuration information on each of the plurality of cells when the PRS configuration information does not include cyclic prefix (CP) length information and cell specific reference signal (CRS) antenna port configuration information of the aggregated PRS for each of the multiple sets.

5. The method of claim 4, wherein when the CP length information or the CRS antenna port configuration information, which is included in the PRS configuration information on cells corresponding to one of the multiple sets, is not the same, or when the CP length information or the CRS antenna port configuration information is included in PRS configuration information on a part of the cells corresponding to one of the multiple sets only, the method further comprises:

when there is a primary cell configured for the terminal among the cells corresponding to the one of the multiple sets, determining that the CP length information or the CRS antenna port configuration information included in the PRS configuration information of the primary cell is applied to an aggregated PRS for the one of the multiple sets, and when there is no primary cell among the cells corresponding to the one of the multiple sets, determining that the CP length information or the CRS antenna port configuration information, which is included in PRS configuration information of a cell having a lowest cell index among the remaining cells of the one of the multiple sets, is applied to an aggregated PRS for the one of the multiple sets.

6. The method of claim 4, wherein when the CP length information or the CRS antenna port configuration information, which is included in the PRS configuration information on cells corresponding to one of the multiple sets, is not the same, or when the CP length information or the CRS antenna port configuration information is included in PRS configuration information on a part of the cells corresponding to one of the multiple sets only, the method further comprises:
   determining that the CP length information or the CRS antenna port configuration information included in PRS configuration information of a predetermined cell is applied to an aggregated PRS for one of the multiple sets.

7. The method of claim 4, wherein when the CP length information or the CRS antenna port configuration information, which is included in the PRS configuration information on cells corresponding to one of the multiple sets, is not the same, or when the CP length information or the CRS antenna port configuration information is included in PRS configuration information on a part of the cells corresponding to one of the multiple sets only, the method further comprises:
   when PRS configuration information on one or more cells among the cells corresponding to the one of the multiple sets includes information on an extended CP length,
   determining that the extended CP length is applied to an aggregated PRS for the one of the multiple sets,
   wherein the extended CP length is configured in a subframe in which the aggregated PRS is transmitted only.

8. The method of claim 4, wherein when the CP length information or the CRS antenna port configuration information, which is included in the PRS configuration information on cells corresponding to one of the multiple sets, is not the same, or when the CP length information or the CRS antenna port configuration information is included in PRS configuration information on a part of the cells corresponding to one of the multiple sets only, the method further comprises:
   determining that transmission of an aggregated PRS for the one of the multiple sets is not valid.

9. The method of claim 4, wherein when PRS configuration information on a single cell corresponding to one of the multiple sets includes the CP length information or the CRS antenna port configuration information, the method further comprises;
   determining that the CP length information or the CRS antenna port configuration information on the single cell is applied to an aggregated PRS for the one of the multiple sets.

10. The method of claim 4, wherein when the CP length information or the CRS antenna port configuration information, which is included in the PRS configuration information on cells corresponding to one of the multiple sets, is the same, the method further comprises:
    determining that transmission of the aggregated PRS for the one of the multiple sets is valid.

11. The method of claim 1, further comprising receiving information on a valid section for generating a single RSTD measurement value based on the aggregated PRSs.

12. A terminal configured to receive a reference signal for positioning in a wireless communication system, the terminal comprising:
    a transceiver; and
    a processor configured to:
       control the transceiver to receive neighboring cell-related information including information on a plurality of cells corresponding to multiple sets of co-located component carriers (CCs) each of the multiple sets of co-located CCs being aggregated to transmit an aggregated positioning reference signal (PRS) within a bandwidth being proportional to a number of the aggregated CCs,
    control the transceiver to receive aggregated PRSs from the multiple sets of co-located CCs using the information on the plurality of cells, and
    measure a reference signal time difference (RSTD) for the multiple sets using the received aggregated PRS,
    wherein each sequence of the aggregated PRSs is initialized by a unique identifier assigned to a respective one of the multiple sets, and
    wherein the multiple sets have a RSTD measurement priority of a CC having a highest RSTD measurement priority among the co-located CCs in a respective set of co-located CCs, and each of the co-located CCs in the respective set have a RSTD measurement priority being determined according to reference signal received quality (RSRQ) of the PRS received from the each of the co-located CCs.

* * * * *